United States Patent [19]

Hartung

[11] Patent Number: 5,094,605
[45] Date of Patent: Mar. 10, 1992

[54] FLASH REMOVAL DEVICE IN A PLANT FOR PRODUCTION OF MINERAL WOOL

[75] Inventor: Gunnar Hartung, Skövde, Sweden

[73] Assignee: Rockwool Aktiebolaget, Skövde, Sweden

[21] Appl. No.: 653,053

[22] Filed: Feb. 11, 1991

[30] Foreign Application Priority Data

Mar. 1, 1990 [SE] Sweden ............... 9000734

[51] Int. Cl.⁵ .................................. C21B 7/14
[52] U.S. Cl. ........................ 425/225; 264/169; 266/230
[58] Field of Search ............ 425/225, 226, 228; 222/591; 266/227, 230, 281; 264/169

[56] References Cited

U.S. PATENT DOCUMENTS

| | | | |
|---|---|---|---|
| Re. 13,929 | 6/1915 | Hitchcock | 65/329 |
| 808,810 | 1/1906 | Brookfield | 222/591 |
| 3,374,930 | 3/1968 | Hase et al. | 222/591 |
| 3,459,346 | 8/1969 | Tinnes | 222/591 |
| 4,037,762 | 7/1977 | Ruckstuhl | 222/591 |
| 4,096,976 | 6/1978 | Daussan | 222/591 |
| 4,327,847 | 5/1982 | Tinnes | 222/591 |
| 4,639,927 | 1/1987 | Uno et al. | 266/230 |
| 4,708,193 | 11/1987 | Tinnes | 222/591 |
| 4,867,428 | 9/1989 | Fricker | 222/591 |

*Primary Examiner*—Jay H. Woo
*Assistant Examiner*—W. J. Matney, Jr.
*Attorney, Agent, or Firm*—Nilles & Nilles

[57] ABSTRACT

A device for the removal of a solidified mineral melt, termed flash, from the discharge end of a spout (3) of a transport channel (1) that is used to carry liquid mineral melt (2) to a mineral wool fiber producing unit (4). The device has a finger (9) made of a heat resistant material which is mounted to be quickly moved by a motor (10, 11) past and through liquid mineral melt (5) below and adjacent the spout (3) on the melt channel (1) in order to scrape off existing flash material from the discharge end of the melt channel (1). The device optionally may have a thermosensor, that emits an alarm signal, in case the temperature of the mineral melt at any point falls below a predetermined temperature, and/or a sensor designed to immediatley actuate the flash removal finger (9) as soon as a tendency to flash formation appears.

10 Claims, 1 Drawing Sheet

FLASH REMOVAL DEVICE IN A PLANT FOR PRODUCTION OF MINERAL WOOL

BACKGROUND OF THE INVENTION

The present invention generally relates to a machine for production of mineral wool from a mineral melt, and the invention more specifically relates to a device for the machine designed to remove solidified mineral material, termed flash, which forms on a channel, from which a mineral melt is discharged into a fiber producing unit.

When mineral wool is produced, a continuous flow of the mineral melt is led from a melt channel to a fiber-producing device in the form of a freely falling melt jet. The fiber-producing device is e.g. a spinning machine or a simple blow-off nozzle. Most fiber-producing devices require, in order to function satisfactorily and produce mineral wool having a satisfactory quality, that the melt is fed to the fiber-producing elements in a controllable way. Partly the flow variations must not be too large and partly every melt jet must hit the fiber-producing device in a certain area, if the fiber production is to take place in an optimal way.

Generally the mineral melt is led to the fiber-producing device in a V-shaped channel. The channel is terminated with a spout, designed in a suitable way, and it is positioned in such a way, that the melt jet hits the fiber-producing device in the proper area.

In case the channel is not completely heat-insulated, it will cool the mineral melt, particularly alongside the bottom of the channel mineral. When wool is produced the temperature of the melt is close to the melting point of the mineral and therefore any slight amount of cooling alongside the bottom of the channel may cause the melt to approach its solidification temperature resulting in the viscosity of the melt increasing.

When this viscous melt reaches the spout and leaves the channel, it will be additionally cooled by the ambient air and solidify. As solidification takes place, the flash is formed slowly, to a greater or lesser degree, roughly in the same way as when icicles are formed. This solidification process is referred to as flash formation and when a viscous melt is close to a temperature where solidification can occur, the melt is said to have flash formation tendencies.

In case the conditions favor a flash-formation, then the flash usually grows successively. Consequently, the melt jet, which normally falls freely from the spout of the melt channel, will flow on the flash and then the melt jet may have its course changed in an unpredictable way. This problem has been solved earlier by removing the flash manually by means of a hook or a scraper.

Manual removal of flash requires the presence of personnel in order to check whether a flash has been formed and if that is the case to remove the flash. Also, strength as well as a certain degree of skill are required in order to remove the flash, particularly since, when the flash is scraped off, melt to some extent comes along. Care must be taken to assure that scraped off melt does not splash and injure personnel or damage surrounding equipment. Also, the removal of the flash can result in disturbances of the fiber production process.

Thus, the purpose of the present invention is to solve the above-mentioned problems and suggest a device designed to, mechanically and without risks of harming personnel and the plant, remove flash from the melt channel in a fiber-producing plant in connection with the fiber production. According to the invention said device comprises a rod or a finger, made of a heat resistant material, e.g. steel, which finger is disposed and designed in such a way that it can be quickly moved mainly horizontally past the channel, vertically below the spout of the channel.

This movement is done mechanically and is identical over and over again, which means that the rest of the parts of the plant can be designed to accommodate this removal. For example, a collection device for the removed flash may be provided or no sensitive plant parts will be located in the direction in which the flash will be propelled as it is scraped off.

The flash removal can also be remote-controlled, e.g. from a control room, in which the operator is protected from that noise, heat and melt splash, which usually is generated, where a mineral melt is transformed into fibers.

Also the invention results in a quick removal of the flash.

Thus, we have found that it is advantageous to move the flash removal device mainly perpendicular to the longitudinal direction of the melt channel, e.g. from a rest position on one side of the melt jet to a corresponding rest position on the other side. This process is different from the manual flash removal, which usually is done by movements in the longitudinal direction of the melt channel, normally in a direction towards the operator.

It is particularly advantageous to mount the flash removal finger around a vertical shaft on the lower surface of the melt channel, preferably in the center line of the channel, and to rotatably mount the flash removal finger allowing it to swing in a movement past and through the melt jet and through any flash material that may have formed. This movement suitably can be done by means of a compressed-air piston or another motor, which swings or rotates the flash removal finger and makes it scrape off the flash material from the melt channel. When the finger is designed with a swinging movement, the flash is scraped off in one direction and alternately in the other direction. This means that a collection device for the flash material must be used on both sides of the melt jet. The flash removal finger can alternatively be designed to revolve completely around its shaft, i.e. from a rest position past the flash and back to the same rest position. Then the flash material always is scraped off in the same direction, and one single collection device for the flash material is sufficient.

SUMMARY OF THE INVENTION

In the simplest embodiment according to the present invention the flash removal finger movement is initiated directly by an operator, similar to the flash removal done according to the known manual methods. However, then a certain degree of operator attention is needed.

Since the presence of an operator is not required, when the flash removal is done according to the present invention, it is possible to completely automatize the flash removal process. This can be accomplished by initiating the flash removal finger movement through the melt jet and against possible flash material by means of a sensor, which detects the temperature of the melt jet at a point close to the melt channel and preferably adjacent the spout of the melt channel.

One advantage of such an automatic flash removal arrangement is that it is easy to observe the frequency of the flash removal and the speed at which the flash material is formed and in this way sense an abnormal situation and emit an automatic alarm signal. Thus, if the flash removal frequency is too high it indicates that the process in some way has got out of order. For example, if the flash removal frequency exceeds a certain predetermined frequency, it is possible to use this information to cause automatic emitting of an alarm signal.

BRIEF DESCRIPTION OF THE DRAWING

The present invention will now be described by referring to an embodiment of a flash removal device according to the invention.

DESCRIPTION OF THE PREFERRED EMBODIMENT

Figure 1:
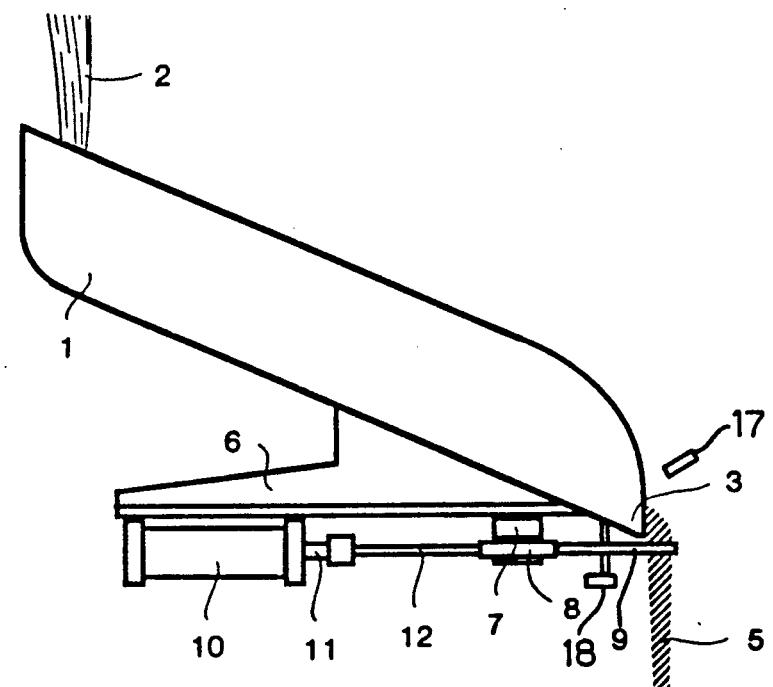
FIG. 1 is a lateral view of a schematically depicted flash removal device according to the invention.
Figure 2:
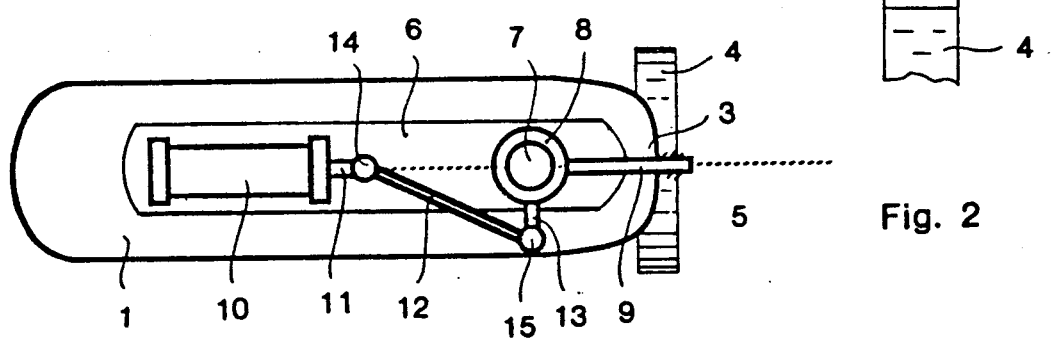
FIG. 2 shows the same device from below.

In FIGS. 1 and 2 a melt channel 1 is shown, designed to guide a mineral melt 2 from a melting furnace (not shown) to a schematically shown fiber production unit or device, placed below the lower discharge end of spout 3 of melt channel 1. The fiber production device comprises e.g. a number of cylindrical spinning wheels, one of spinning wheels 4 being designed to receive the melt, when the melt in the form of a melt jet 5 falls from melt channel 1 through an open space. Receiving spinning wheel 4 then throws at least a portion of the melt to one or several (not shown) secondary spinning wheels, from which mineral or mineral wool fibers are centrifuged and collected in the form of a mineral wool mat.

Figure 3:
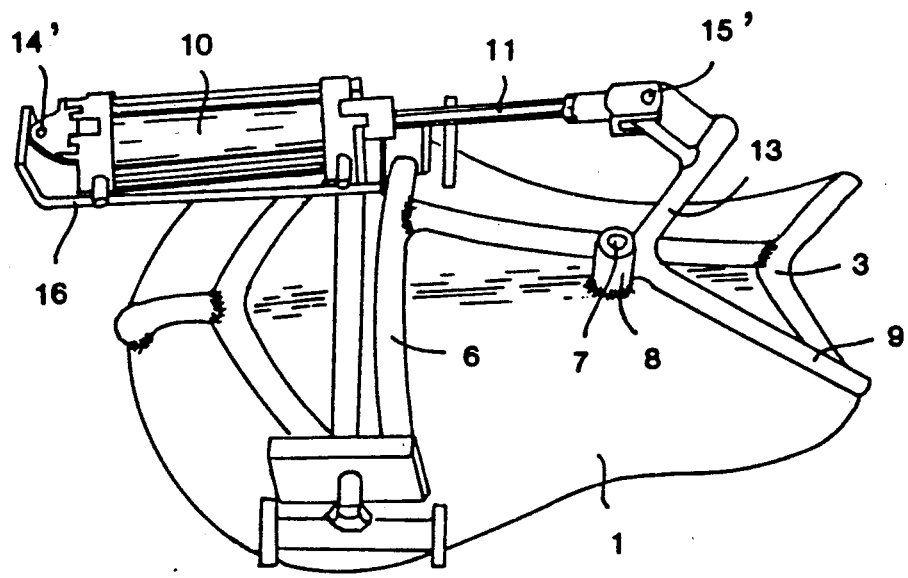
FIG. 3 shows an alternative embodiment of a melt channel with a flash removal device being mounted on it, seen from below in a perspective view.

A bracket 6 is mounted on the lower surface of melt channel 1 and a vertical shaft 7 is fastened to the bracket. A ring or sleeve 8 is rotatably mounted around said vertical shaft 7. Ring 8 is used as a holder for a flash removal finger 9, which has such a length and is mounted in such a position, that it can be swung or rotated past and through melt jet 5. In its rest position flash removal finger 9 is positioned beside the melt jet, as is shown in FIG. 3, but in FIGS. 1 and 2 the finger is shown in an explanatory way precisely in front of melt jet 5 in a phase of a flash removal process.

Also, a compressed-air cylinder 10 is fastened to bracket 6. Piston stem 11 in compressed-air cylinder 10 is, by means of a rod 12, connected to an arm 13 in an articulated way, which arm in its turn is fastened to ring 8. Rod 12 is by means of a first joint 14 connected to piston stem 11 and by means of a second joint 15 connected to arm 13. Piston stem 11 is shown in FIGS. 1 and 2 in a central position. When it is in its normal inactive, completely retracted position in cylinder 10, flash removal finger 9 is positioned on one side of melt jet 5, and when piston stem 11 is completely projected, as is shown in FIG. 3, flash removal finger 9 is positioned on the other side of melt jet 5.

When the piston is moved from one of its end positions to the other and flash removal finger 9 passes through melt jet 5 a possible flash formation will be removed, which is collected in a collector device (not shown), placed along the sides of melt channel 1.

In the device shown in FIG. 3 piston stem 11 is directly connected to a crank arm 13 of the flash removal element, and cylinder 10 is for this purpose rotatably mounted on a supporting plate 16 below melt channel 1.

As was mentioned above, the device suitably is provided with a sensor, e.g. a thermosensor 17, which detects the temperature of the melt close to spout 3 of melt channel 1, e.g. at a point adjacent the surface of the melt channel and preferably at a point immediately in front of the spout of the melt channel, and said sensor can be connected partly to means designed to initiate a pivoting or a rotation of the flash removal finger, when the observed temperature falls below a certain predetermined temperature. Also, the device can be provided with means designed to emit an alarm signal, when the temperature is too low.

Also, it is feasible to mount on the lower surface of the melt channel some optical, acoustical or other element 18, which directly observes every tendency to flash formation at the spout of the melt channel and which is connected to means, known per se, designed to directly initiate a pivoting of the flash removal finger and a removal of existing flash and/or emit an alarm signal, when the flash formation becomes exceptionally frequent.

I claim:

1. A device for use in removing a solidified mineral melt flash occurring in a mineral wool fiber producing plant of the type that includes a source of liquid mineral melt, a fiber producing unit, a spout having a melt channel for receiving liquid mineral melt from said source and a discharge end located to create an open space in register between said discharge end and said fiber producing unit, said melt channel carrying said liquid mineral melt to said discharge end where it is discharged in an unconfined flow path through said open space as a melt jet with some of said mineral melt forming said solidified mineral melt flash on said discharge end to project into said open space, said device comprising a support means; a flash removal finger made of a heat resistant material mounted on said support means below and adjacent said discharge end at a rest position out of registry with said open space through which said melt jet passes for movement through said open space during operation to contact any of said solidified mineral melt flash that may possibly project into said open space; and a finger actuator on said support for causing said finger to quickly move from said rest position through said open space.

2. The device according to claim 1 wherein
said support means includes a vertical shaft;
said flash removal finger has an inner portion which includes a ring rotatably mounted on said vertical shaft to permit movement of said flash removal finger back and forth about said shaft;
said rest position comprises two end positions, one on each side of said open space, and
said finger actuator is connected to move said flash removal finger back and forth between said two end positions.

3. The device according to claim 2 wherein
said melt channel has a longitudinal center line and a lower surface; and
said vertical shaft is attached to said lower surface of said melt channel at said longitudinal center line.

4. The device according to claim 2 wherein said finger actuator includes a piston/cylinder device,
said mounting ring for said flash removal finger has a crank arm connected to said piston/cylinder device for movement thereby to cause said flash removal finger to swing through said open space transversely across said unconfined flow path.

5. The device according to claim 1 wherein
said melt channel has a lower surface;
a vertical shaft is mounted on said lower surface;
said flash removal finger is mounted for rotation about said vertical shaft; and
said finger actuator includes a motor operative to rotate said flash removal finger one entire revolution from said rest position back to said rest position.

6. The device according to claim 1 further comprising:
a temperature sensor mounted to detect the temperature of said liquid mineral melt at a point along the surface of said liquid mineral melt and generate a temperature responsive signal; and
an alarm means connected to receive said temperature signal and emit an alarm when the temperature of said liquid mineral melt is below a predetermined level.

7. The device according to claim 1 further comprising:

an optical sensing means mounted adjacent said spout discharge end to detect the formation of solidified mineral melt flash and generate an actuating signal in response to such formation operative to energize said finger actuator and move said flash removal finger through said open space.

8. The device according to claim 1 further comprising:
an acoustical sensing means mounted adjacent said spout discharge end to detect the formation of solidified mineral melt flash and generate an actuating signal in response to such formation operative to energize said finger actuator and move said flash removal finger through said open space.

9. The device according to claim 1 further comprising:
a radiation sensing means mounted adjacent said spout discharge end to detect the formation of solidified mineral melt flash and generate an actuating signal in response to such formation operative to energize said finger actuator and move said flash removal finger through said open space.

10. The device according to claim 1 further comprising:
means for detecting the frequency of movement of said flash removal finger and emitting an alarm signal if said frequency exceeds a predetermined level.

* * * * *